United States Patent
Tsai et al.

(10) Patent No.: US 6,376,115 B1
(45) Date of Patent: Apr. 23, 2002

(54) METAL FUEL CELL WITH MOVABLE CATHODE

(75) Inventors: Tsepin Tsai, Chappaqua; Sadeg M. Faris, Pleasantville, both of NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/594,649

(22) Filed: Jun. 15, 2000

(51) Int. Cl.$^7$ .......................... H01M 12/06; H01M 4/42
(52) U.S. Cl. ........................ 429/27; 429/68; 429/101
(58) Field of Search .......................... 429/68, 27, 101

(56) References Cited

U.S. PATENT DOCUMENTS 3,551,208 A * 12/1970 Stachurski
4,800,009 A * 1/1989 Despic et al.
6,299,997 B1 * 10/2001 Faris et al.

* cited by examiner

*Primary Examiner*—John S. Maples
(74) *Attorney, Agent, or Firm*—Gerow D. Brill; Israel Nissenbaum

(57) ABSTRACT

An air depolarized cell with at least one movable cathode element disposed in an active anode metal material which is in a fluid or paste state. The cathode element(s) continuously moves to maintain electrochemical proximity with active anode material as the active anode material is converted into electrochemical cell reaction product. In one embodiment, formation of cell reaction products of increased volume relative to initial anode volume serves to propel the movable cathode through the anode material. Viscosity of the fluid or anode paste is adjusted to ensure cathode movement relative to active anode for maximized utilization.

13 Claims, 5 Drawing Sheets

METAL FUEL CELL WITH MOVABLE CATHODE

FIELD OF THE INVENTION

This invention relates to fuel cells (i.e., cells in which the cathode material is constantly supplied or available, such as air depolarized cells, having non-consumable cathode elements and constantly supplied air (specifically oxygen) as the oxidizing cathode material. The invention particularly relates to metal anode fuel cells having a large metal anode to cathode electrochemical ratio and with anodes in the fluid or permeable fluid/paste state.

BACKGROUND OF THE INVENTION

Generally battery systems have a low gravimetric electrochemical capacity of less than about 200 Whr/kg. Metal fuel cells such as zinc/air cells are however among the highest capacity systems but are generally suited only for extremely low rate application such as remote signal light, hearing aid, and communication system applications.

Despite the high capacities, conventional metal-fuel systems have been characterized by low rate capability as a result of poor cathode performance and availability of limited active cathode depolarization sites. In addition, anode utilization is minimized relative to the total amount of metal anode since effective discharge is confined to a limited surface depth of the anode. Thus, very thick anodes will develop an increasingly larger internal resistance loss when the oxide layer on the anode increases as a result of progressive cell discharge. Accordingly there is a maximum anode thickness, for reasonable operation, of generally only a few millimeters. As discharge current or rate increases, even this small effective thickness is further reduced.

Expedients used to increase utilization capacity of metal air cells have generally embodied fixed cathodes and movable anodes (i.e., fresh anode materials such as tapes or plates are inserted into the cells as reaction products are removed) to enhance cell capacity. Alternatively, as described in co-pending application Ser. No. 09/570798, filed May 12, 2000 (the disclosure of which is incorporated herein by reference thereto), anode material is in the form of a dispensable or flowable paste which is continuously introduced into the cells as reaction products are exhausted therefrom. While effective, this latter system generally requires metal paste transport means such as a pump, as well as a storage system for continuous operation.

SUMMARY OF THE INVENTION

It is an object of the present invention to enhance cell capacity and performance of fuel cells, and more particularly fuel cells with metal containing fluid or paste-like anodes and most particularly metal-air cells while eliminating the need for anode movement and movement-inducing elements by using a fixed anode paste pool and a cathode which is movable within the anode material.

It is a further object of the present invention to enhance volumetric efficiency of the cells by eliminating a pump as used for movement of anode paste.

It is yet another object of the present invention to increase efficiency in the utilization of an anode paste with a movable cathode, with decreased expended energy, while increasing energy density and cell discharge capacity.

It is still yet another object of the present invention to provide a cell with the movable cathode being propelled as a function of the electrochemical cell discharge and reaction.

Generally the present invention comprises a fuel cell with a non-consumable cathode, such as an air depolarized cell, having at least one cathode element disposed in an anode material through which it can be moved. Reaction products (in air depolarized cells the reaction product is an oxide of the anode metal) are often removed from the cell as an exhaust, as new anode material is supplied to the cell usually from a reservoir (the supply or air or oxygen, of course, remains constant). The anode materials are generally comprised of flowable particles of a metal such as of alkali and alkaline earth metals or transition metals such as nickel, iron and zinc and varying alloys thereof. Zinc is most preferred for aqueous cells, and lithium for non-aqueous cells. The anode is preferably in the form of a pool of a fluid or paste material exemplified by a slurry or paste of zinc and electrolyte.

The electrochemical capacity of the anode is the limiting factor in the cell capacity and is adapted to exceed the fixed capacity of the cathode, preferably by several factors (either in the cell itself or as a constant supply from an external reservoir. The cathode element(s), with appropriate enwrapping ionically permeable separator material (for maintaining structural integrity of the cathode and for preventing a short circuiting between anode and cathode), is adapted to effectively move, be caused to move, or "swims" within the anode material, to maintain an electrochemical proximity of active anode material and the active cathode depolarizing element.

In air depolarized cells the cathode element generally comprises a non-consumable element comprised of an electrically conductive material such as carbon affixed to a conductive grid. In a preferred embodiment, the cathode element is contained within a streamlined container element, such as of an ovoid horizontal cross section shape to reduce drag and to facilitate cathode movement within the anode. For maximum utilization efficiency the height of the cathode is substantially matched to the depth of the anode paste. The cathode and the placement thereof within the anode is adapted to permit air access to the cathode from an open and exposed upper end for effective depolarization, during cathode movement. The cathode moves at a rate sufficient to effect substantially complete and effective utilization of proximate anode material and to constantly maintain electrochemical coupling with fresh anode material.

For maximum volumetric efficiency, each cell is preferably of flat shape and is comprised of an air-diffusion cathode, a separator, and a nickel-based current collector, and the metal paste. Examples of separator materials are disclosed in co-pending application U.S. Ser. No. 09/259,068 filed Feb. 26, 1999, relating to conductive polymer gel membrane separators wherein anion- and cation-conducting membranes are formed. The cathode is effectively covered or wrapped in the separator material. The gel composition of the membrane contains the ionic species within its solution phase such that the species behaves as in a liquid electrolyte, while at the same time, the solid gel composition prevents the solution phase from diffusing into the device. Other useful separator materials are disclosed in co-pending application U.S. Ser. No. 09/482,126, filed Jan. 11, 2000, wherein a separator is disclosed which comprises a support or substrate and a polymeric gel composition having an ionic species contained in a solution phase thereof. In preparing the separator, the ionic species is added to a monomer solution prior to polymerization and remains embedded in the resulting polymer gel after polymerization. The ionic species behaves like a liquid electrolyte, while at the same time, the polymer-based solid gel membrane provides a smooth impenetrable surface that allows the exchange of ions for both discharging and charging of the cell. Advantageously, the separator reduces dendrite penetration and prevents the diffusion of reaction products such as metal oxide to remaining parts of the cell. Furthermore, the measured ionic conductivity of the separator is much higher than those of prior art solid electrolytes or electroyte-polymer films.

A suitable cathode structure is described in co-pending application U.S. Ser. No. 09/415,449, filed Oct. 8, 1999, comprised of a porous metal foam substrate, formed with a network of interconnected pores. An active layer and a hydrophobic microporous gas diffusion layer are both disposed on one or more surfaces of the metal foam substrate. The metal foam substrate serves as the current collector of the cathode. The microporous layer is a plastic material such as a fluoropolymer (i.e., PTFE). The cathode may also include a particulate microstructure reinforced by relatively strong bonding provided by sintering a polymeric binder within the three-dimensional interconnected porosity of the metal foam substrate. The reactive layers are preferably fabricated from the same material as binder. This advantageously enables a single roll pressing operation to simultaneously impregnate the binder into the substrate and form the reactive layers thereon. The disclosures of said applications are incorporated herein by reference thereto.

In a preferred embodiment, cathode movement means, such as a wire or rod control, mechanically laterally moves the cathode through the anode material. Activation of the cathode movement means is coupled to a voltage drop sensor in the anode-cathode couple. When a sharp drop, indicative of essentially complete utilization of adjacent anode material, particularly in a zinc air cell, is detected, the cathode movement means are activated for a time sufficient to move the cathode to an adjacent fresh proximity with anode material. In a preferred embodiment of a zinc air cell, the characteristics of the cell provide both the detection and the propulsion means for the cathode wherein a change in volume of the cell reaction materials serve to propel the cathode forward as it is formed. The cells utilizing the present invention range from small cells used to power small appliances in the range of several watts of contained power, to large electrical supply cells of megawatt power levels.

The above objects, features and advantages of the present invention will become more evident from the following discussion and the drawings in which:

DETAILED DESCRIPTION OF THE INVENTION

Figure 1:
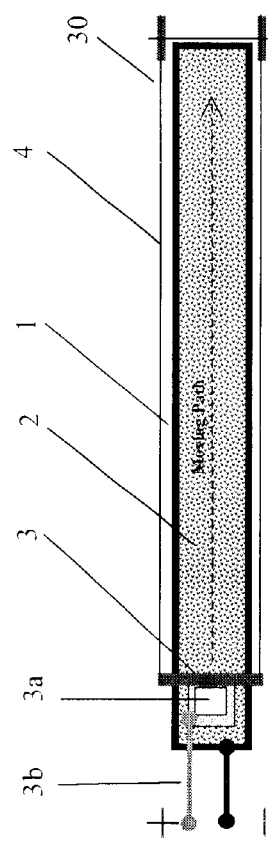
FIG. 1 is a top view of a movable cathode in a cell container of a fluid anode material with a visible air collection segment.

In the above described zinc air cell with movable cathode, after the discharge of proximate anode material, the cathode is moved or otherwise moves to another fresh metal paste section of the anode. As a result, the cell system constantly becomes a brand new cell, ready for an additional life as an electrochemical cell with maximized overall discharge capacity.

Because a fresh interface is always available between cathode and anode resulting from the moving cathode, cells with the movable cathode system of the present invention are suitable for high rate discharge, in an otherwise low rate system. A high resistance buildup at the anode-cathode interface, which normally limits the rate of discharge is avoided. Furthermore, a series of electrically interconnected cathodes, movable in tandem also increases the power and discharge capability of the cell. In this latter embodiment the cathodes are preferably formed into shuttle shapes to pass through the metal paste "pool" with minimization of anode depth relative to an active cathode interface. The multiple cathodes and anode can be electrically arranged into variations of parallel and serial configurations.

Only relatively simple and volumetrically minimal driving means is required for the cathodes and, in contrast to other fuel cell designs, no pump for the supply of the metal anode paste and removal of reaction product is necessary or utilized, thereby greatly simplifying cell design. Furthermore, no separate storage and supply reservoir is required to constantly supply fresh anode material. Instead, in the present structure, the reservoir actually becomes the cell itself.

In addition, the system readily lends itself to electrical recharging and mechanical refueling of anode paste for continuous operations for applications, such as for providing a reliable power source for electric vehicles. Since the anode is present as a fluid pool, if desired, it is readily replenished, as is the electrolyte, which comprises a major portion of the composition of the liquid paste component.

Movement of the cathode may be mechanically effected by various means such as with connected gears, belts, and the like. A preferred embodiment however comprises modification of the cathode shape to take advantage of a characteristic of the electrochemical cell reaction to effect the requisite motion in the form of a self driving action. In zinc air cells, the zinc containing reaction product, i.e., zinc oxide, formed adjacent the cathode, occupies a volume of about 30% more than the original cell components. As a result, a significant pressure is exerted on the cathode during discharge. The cathode is therefore adapted to be tapered with a flat or beveled rear section surface, e.g., a teardrop configuration to effectively channel the pressure to a propelling force in the appropriate direction of travel.

In a further preferred embodiment, the cell is rechargeable, such as with the mechanical replacement of consumed metal paste with fresh metal paste, in a process referred to as mechanical recharging. Alternatively, the original anode metal paste may be regenerated electrically by recharging the cell with application of external power to recharge the cell and conversion of metal oxide paste to metal paste. With either embodiment, the cathode may be configured to travel from left to right for the first run and afterwards, with replacement or recharging, the air depolarized cathode is reversed to travel from the right to left.

In another embodiment, regeneration of the system (one or more cells) is effected with use of a supplying reservoir as disclosed in said co-pending application U.S. Ser. No. 09/570798, with one tank being used to provide fresh anode material and to accommodate cell reaction product, with such actions being effected either automatically or manually. With several cells being supplied from a single reservoir, isolation means are preferably supplied between reservoir supply and the individual cells as well as between the individual cells and the chamber of the reservoir which is used to receive fuel cell exhaust or cell reaction material. The isolation means prevent self discharging electrical bridges between the cells through conductive anode material or conductive exhaust material.

DETAILED DESCRIPTION OF THE DRAWINGS AND THE PREFERRED EMBODIMENTS

With specific reference to the drawings, as shown in FIGS. 1–5, zinc/air cell 1 is comprised of a zinc anode paste 2, comprised of zinc particles admixed with electrolyte material (e.g., a standard 35% aqueous KOH solution); and cathode/separator member 3, within a container 4. Cathode/separator member 3 is comprised of a high surface area conductive carbonaceous material on a metal conductive substrate wrapped in a polymeric ionically permeable separator material. The upper end 3a of the cathode/separator 3 is exposed to the air for influx of oxygen for depolarization (alternatively air ducts can be provided to the cathode if it is completely immersed in the fluid anode). Cathode/separator 3 is controlled by moving element 30, which is coupled to a voltage monitoring circuit (not shown). When the voltage of the electrochemical cell combination of anode and cathode drops to a pre-determined level, moving element 30 is activated to move the cathode through the fluid anode in the direction shown by the arrow until there is a new electrochemical interface between the cathode/separator 3 and fresh anode material (as depicted in dotted line). Electrical terminals (not shown) for the anode 2 and cathode 3 allow for interconnection to an external device requiring electrical current. The cathode terminal connector 3b (electrically connecting the terminal and the movable cathode) is extendible and provides an electrical connection for the cathode at all times.

Figure 2:
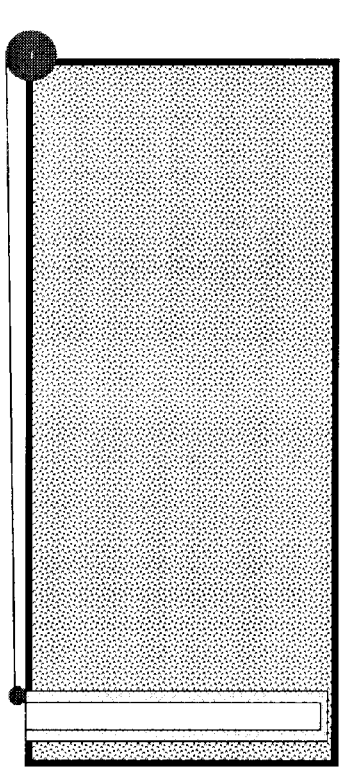
FIG. 2 is a sectioned side view of the cell of FIG. 1 showing the cathode configuration with the fluid anode material.

As seen in FIG. 2, cathode/separator 3 extends for the full depth of the anode to maximize interfacial area with concomitant maximization of anode utilization. The ellipse form of the cathode horizontal cross section facilitates movement of the cathode through the anode material during use.

Figure 3:
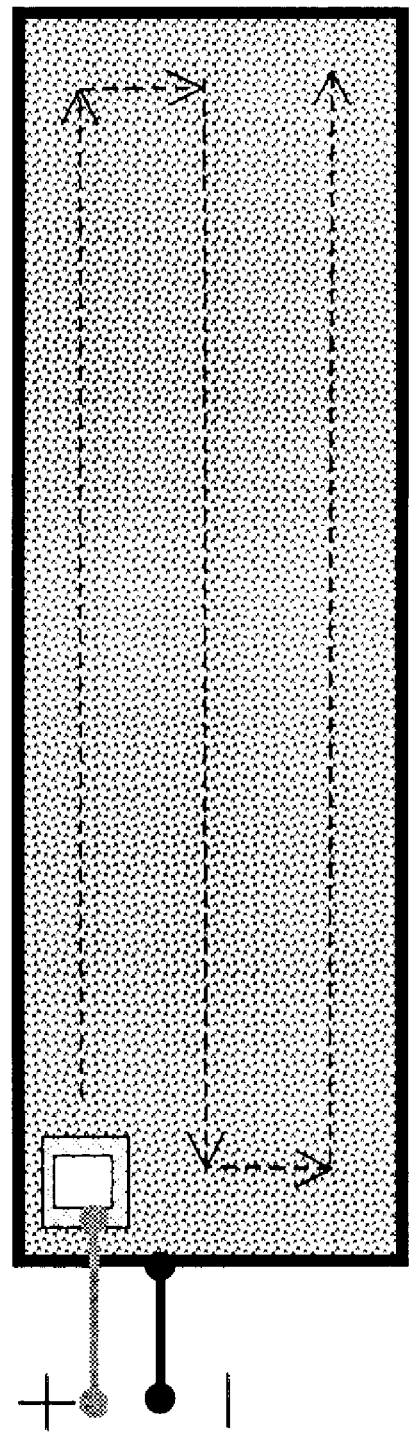
FIG. 3 is schematic top view of a cell showing 2-dimensional directed movement of a single cathode element for optimized coupling with anode material.

With the cathode being mechanically directed, as shown in FIG. 3, the cathode 3 is moved two dimensionally to assure maximum utilization, throughout the various length and width of the anode material, of a cell configuration.

Figure 4:
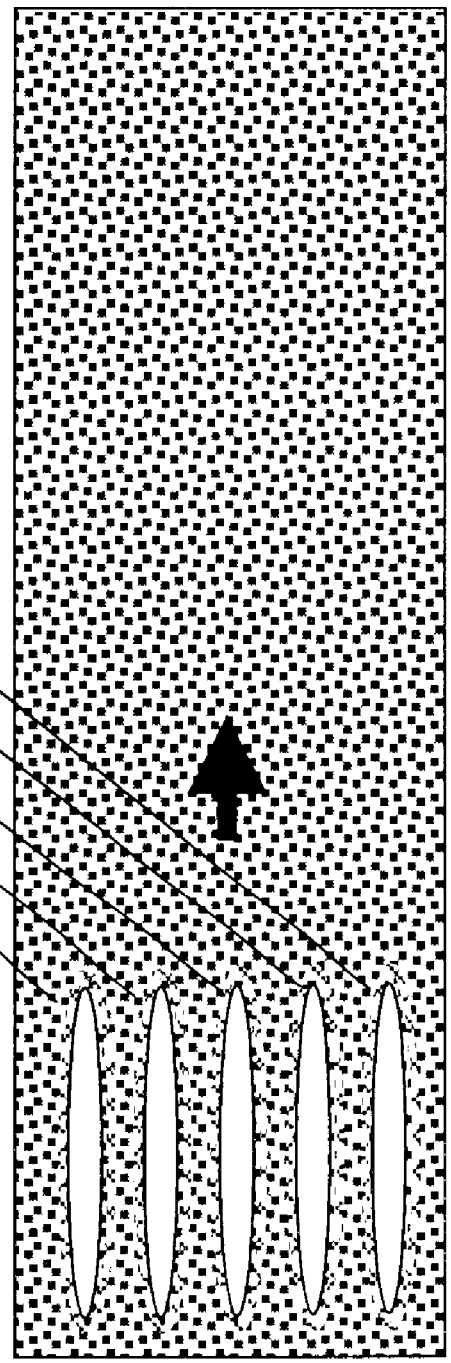
FIG. 4 is a top view of a larger cell showing a number of electrically interconnected cathode elements within a fluid anode.

FIG. 4 schematically depicts five parallel cathode/separator elements 30a–e for increased anode/cathode interfacial area and enhanced utilization of the anode material particularly when the depth of anode between cathode members or between anode and container is more than several millimeters. Electrical interconnections of the cathodes are extendible and are orientated according to the desired electrical configuration. It is noted that each interface between anode and cathode can be configured as a separate cell and the overall cell 1 may be used with separate electrical taps to power numerous separate devices. Alternatively, the cathodes may be linked in parallel to enhance discharge rate (with continued enhancement as the cathodes move in tandem).

Figure 5:
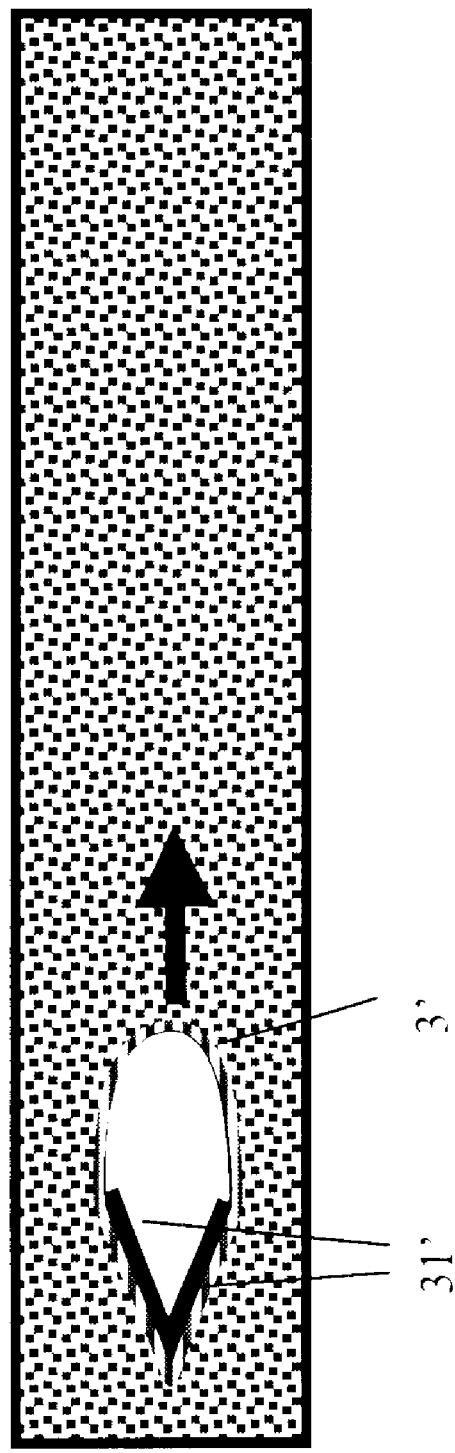
FIG. 5 is a top view of a cell and movable cathode adapted to be self propelled by increase in volume electrochemical cell reaction material.

Cathode 3' shown in FIG. 5 is approximately tear shaped with flat sections 31'. As a result of this configuration, pressure exerted by the increasing volume of cell reaction product zinc oxide (about 30% greater volume than the original zinc) causes the cathode 3' to "squirt" forward until the pressure is relieved, i.e., at fresh anode site 2' (as depicted in dotted lines). The cell is thus able to be continuously renewed with a self propelled cathode and without any loss of volume resulting from propelling elements.

Figure 6:
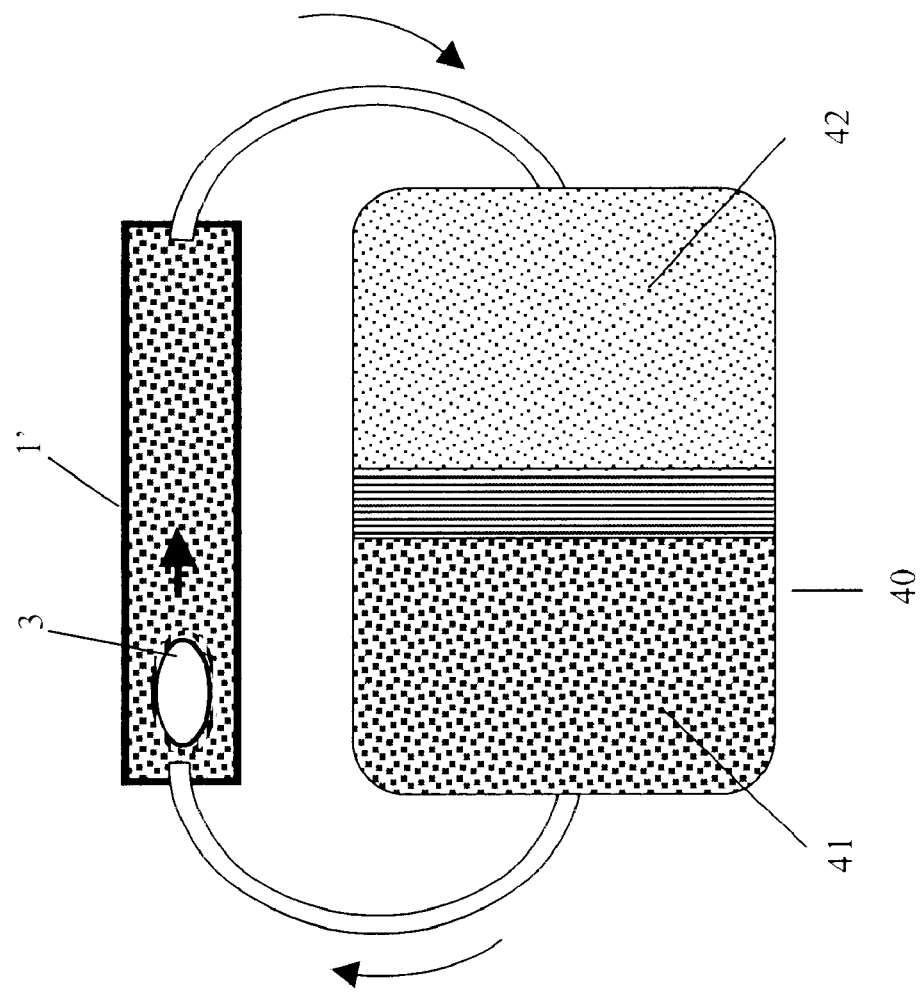
FIG. 6 is a schematic view of a cell having a reversibly movable cathode and circulating anode material and electrochemical cell reaction product held in a reversible reconfigurable reservoir.

The cell 1' shown in FIG. 6 is a hybrid configuration utilizing the movable cathode and the renewable and reversible reservoir/storage system of said co-pending application. Cathode 3 in oval shape is reversible in direction to conform to the exchange in the reservoir 40 with inversely proportional chambers 41 and 42 which hold fresh anode material and reaction products (primarily zinc oxide) respectively. When chamber 42 is completely filled and chamber 41 is depleted and reduced in size, the zinc oxide is reduced to active zinc anode material and chamber 42 becomes the anode supply chamber and chamber 41 becomes the storage chamber for the reaction product. Cathode 3 reverses direction for effective full anode utilization in accordance with the present invention.

It is understood that the above examples and drawings are exemplary of embodiments of the present invention and that changes may be made in structure and components of the cell, cathode and reservoir and the like without departing from the scope of the present invention as defined by the following claims.

What is claimed is:

1. An electrochemical cell comprising an anode and a non-consumable cathode contained within a cell container, wherein said anode is in a permeable fluid state in admixture with a fluid electrolyte and said cathode is disposed within said fluid anode to form an electrochemical cell interface characterized in that said cell further comprises means for moving said cathode through said anode to provide an electrochemical cell interface between the cathode and additional material of said anode.

2. The cell of claim 1, wherein said cathode comprises a plurality of electrically interconnected cathode elements, each of which is movable within said anode.

3. The cell of claim 1, wherein the cell comprises means, integral with electrochemical characteristics of the cell, to cause said cathode to move.

4. The cell of claim 3, wherein the electrochemical cell reaction products comprise a volume greater than the original cell components of anode and cathode, wherein a pressure is exerted on the cathode and wherein the cathode is asymmetrically formed to be moved by said pressure toward an interface with additional anode material.

5. The cell of claim 4, wherein said asymmetric formation is a teardrop shape.

6. The cell of claim 1, wherein said cathode is adapted to reverse the direction of its movement with replacement of anode material in said cell.

7. The cell of claim 6, wherein said replacement comprises a mechanical replacement of reaction product with anode material.

8. The cell of claim 6, wherein said replacement comprises an in situ electrical conversion of reaction product to anode material.

9. The cell of claim 1, wherein the anode is comprised of zinc particles and said cathode is air-depolarized and wherein said cell comprises means for supplying air to said cathode.

10. The cell of claim 1, wherein said cell is connected to reservoir means having a chamber containing fluid anode material with means for supplying anode material to said cell and means for removing electrochemical cell reaction product from said cell to a second chamber of said reservoir wherein said chambers are inversely proportionally changeable in volume with respect to each other with the supply of anode material and removal of reaction product and wherein said cell further comprises means for reversing direction of movement of said cathode within the anode material.

11. The cell of claim 1, wherein the cell comprises means for moving the cathode through the anode in axial and longitudinal directions to maximize electrochemical utilization of the anode.

12. The cell of claim 1, wherein the cathode is enclosed in a gelled separator element.

13. The cell of claim 1, wherein the cathode comprises a metal foam substrate with an active layer and a hydrophobic microporous gas diffusion layer being disposed on one or more surfaces of the metal foam substrate.

* * * * *